United States Patent Office 3,581,337
Patented June 1, 1971

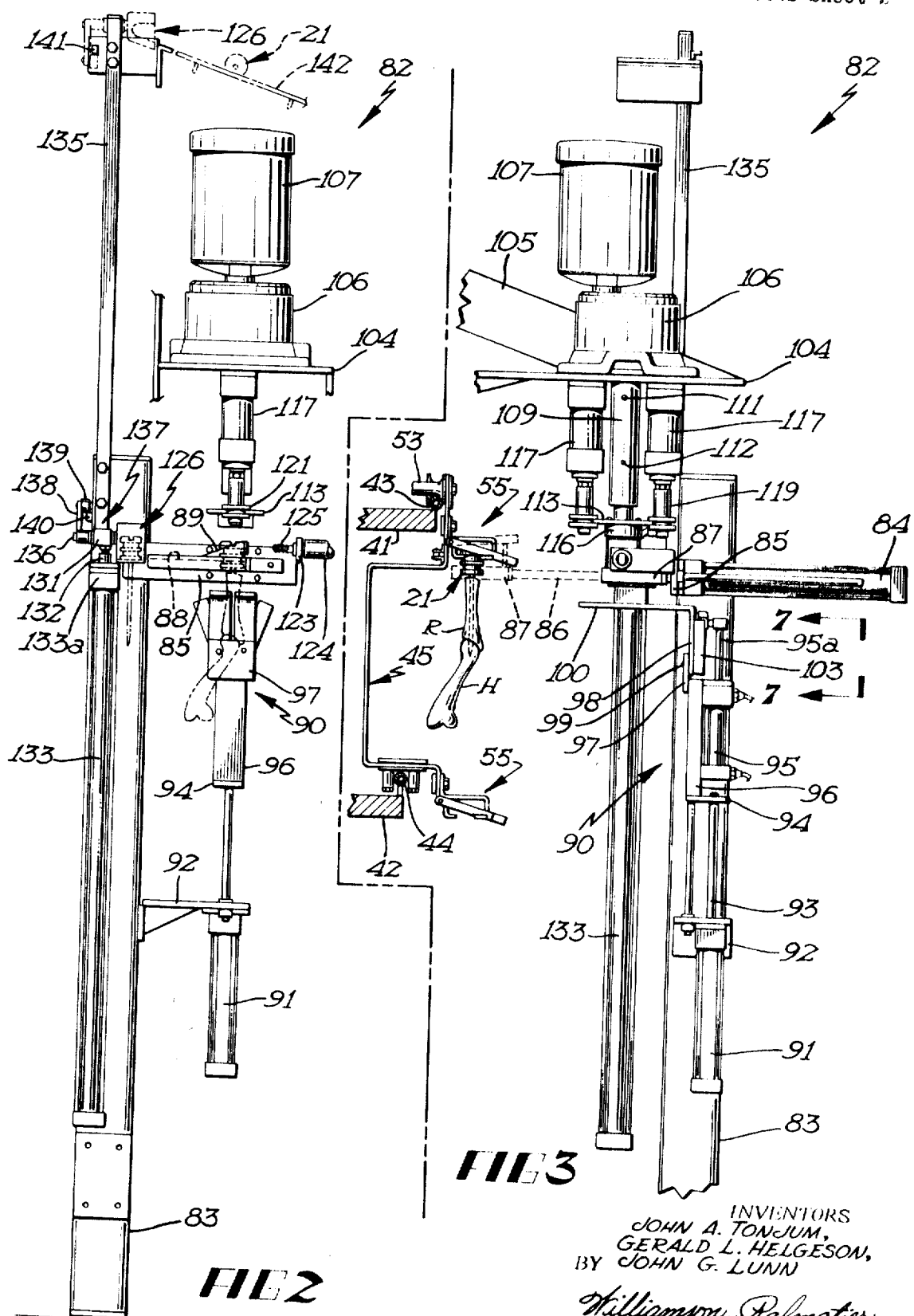

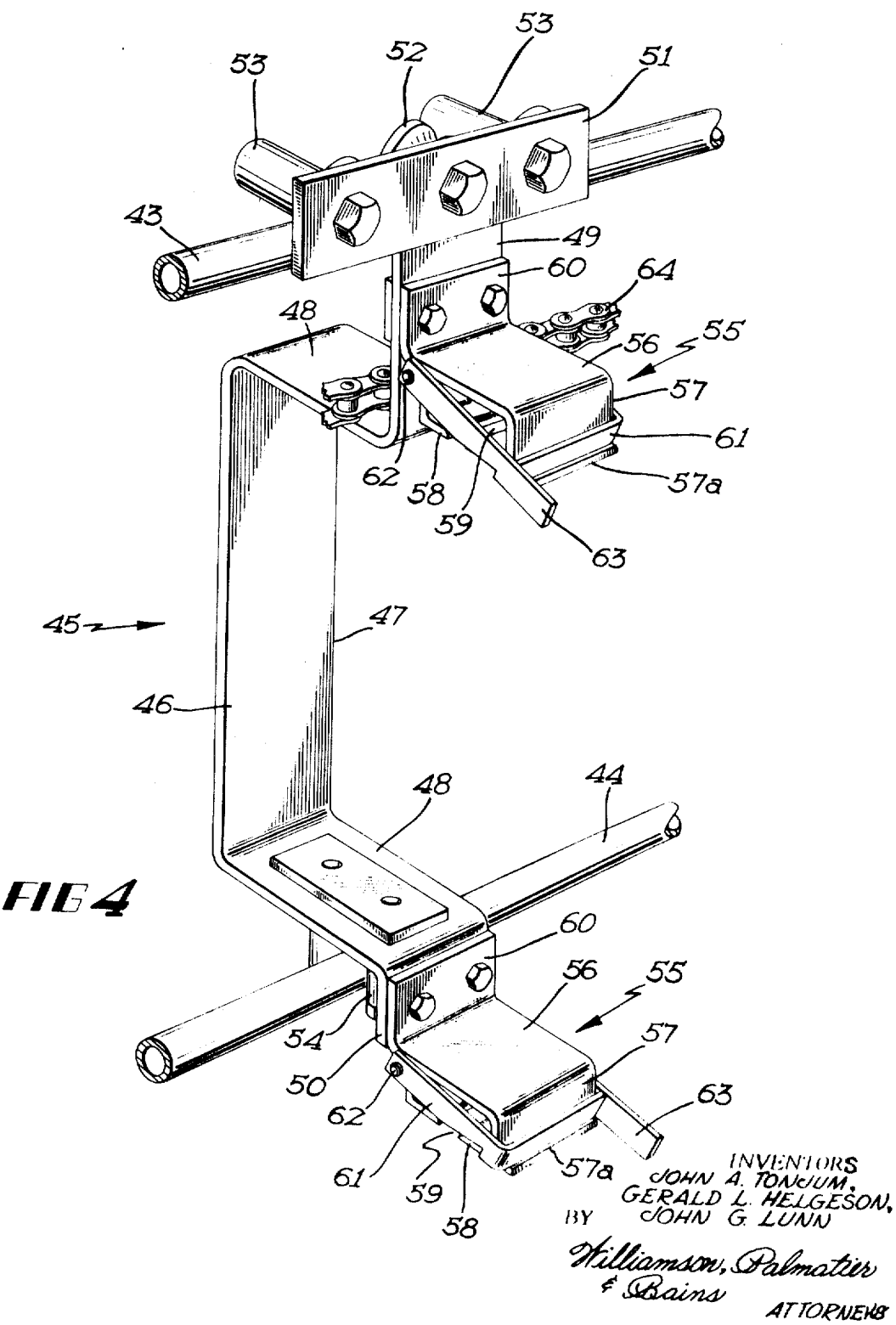

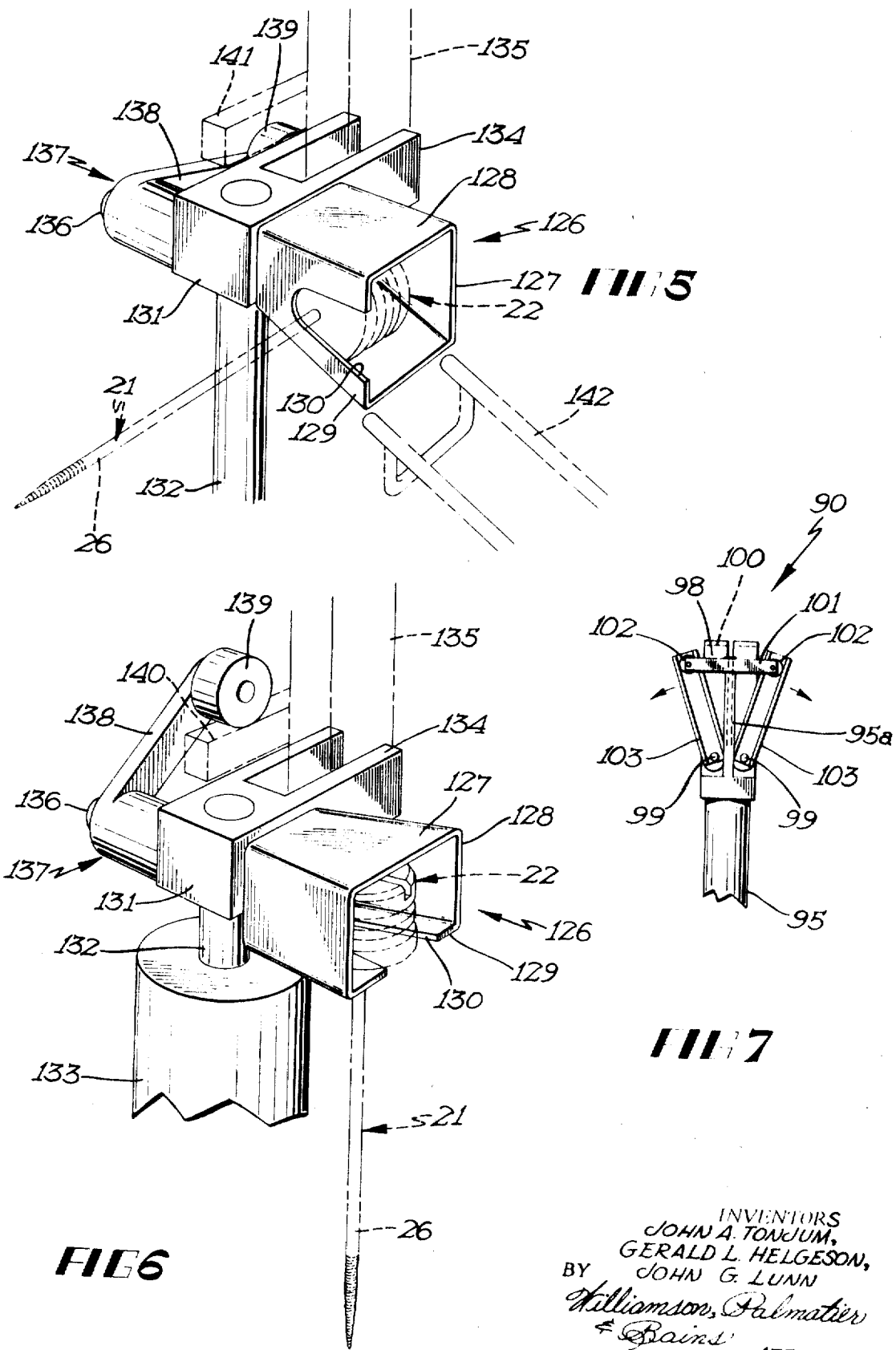

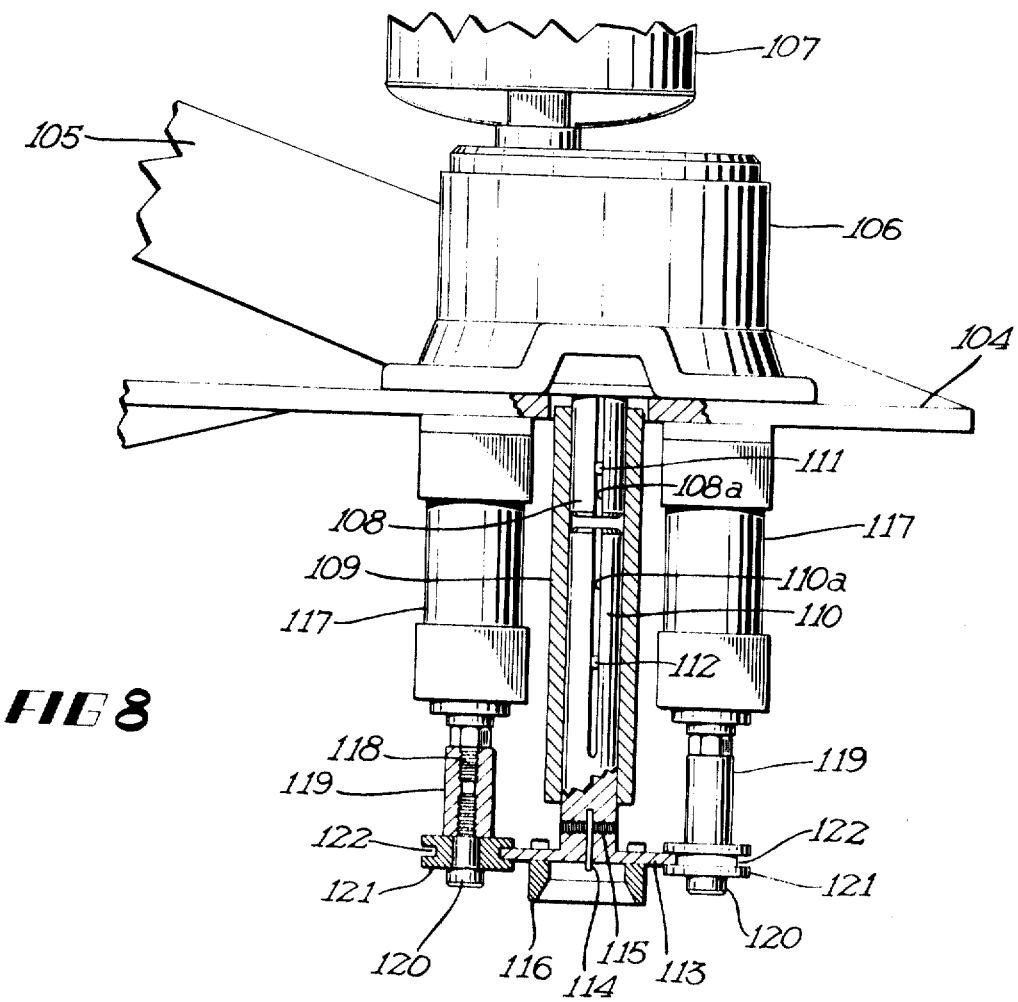
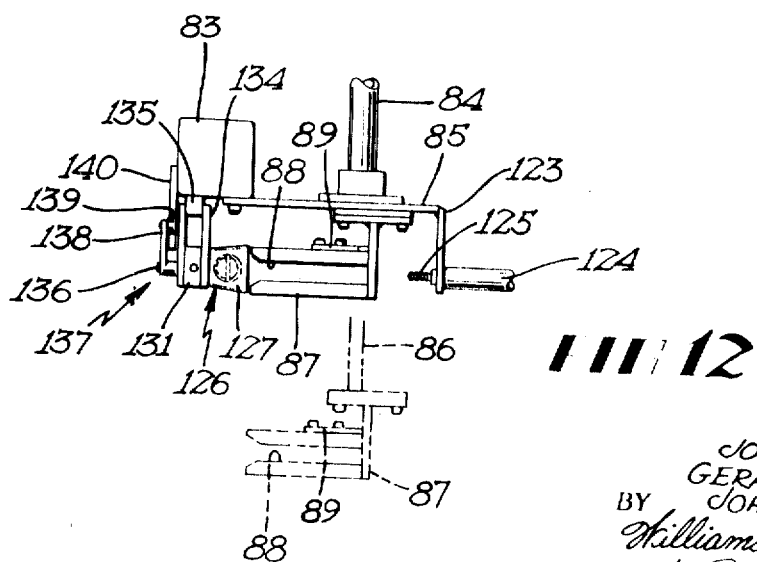

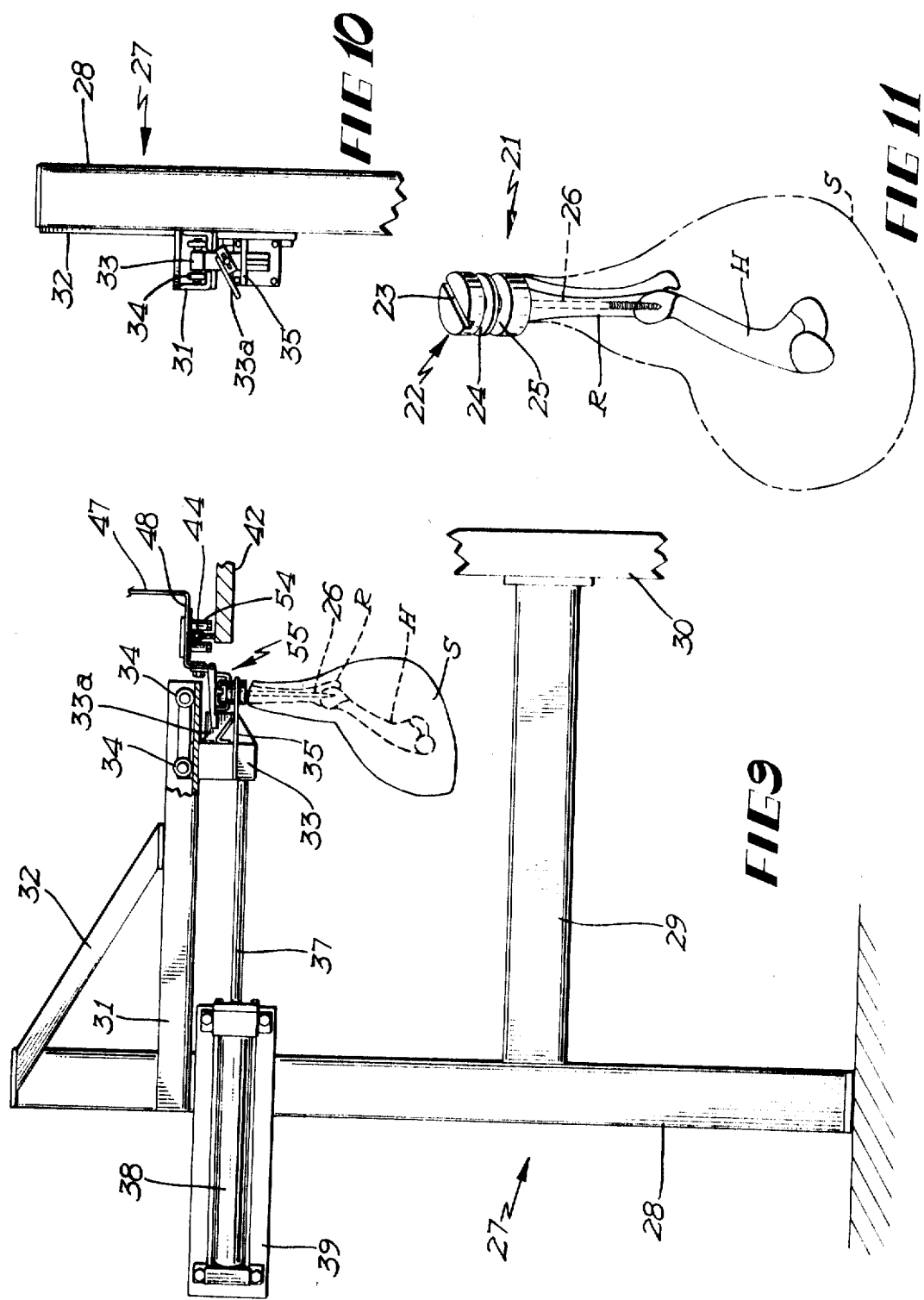

3,581,337
APPARATUS HANDLING SYSTEM FOR USE IN A DEBONING OPERATION
John A. Tonjum, Gerald L. Helgeson, and John G. Lunn, Austin, Minn., assignors to Geo. A. Hormel & Company, Austin, Minn.
Filed Aug. 28, 1969, Ser. No. 853,743
Int. Cl. A22c 17/04
U.S. Cl. 17—1G 12 Claims

ABSTRACT OF THE DISCLOSURE

An apparatus system for use in a deboning operation in which bones are extracted from chunks of meat, comprises a conveyor device including a plurality of support mechanisms which engage the external fitting of the pin device applied to the embedded bones of a chunk of meat to permit each chunk of meat to be continuously and mechanically transferred to the deboning unit. The conveyor device also includes a plurality of support mechanisms which receive the pin devices and extracted bones attached thereto from the deboning unit so that the pin devices and attached bones can be transferred to a pin removal apparatus wherein the pin devices are continuously and mechanically disengaged from the extracted bones. Means are also provided for transferring the pin devices after separation from the extracted bones to a bone pinning machine where the pin devices are again applied to the bones in each chunk of meat.

SUMMARY OF THE INVENTION

The present apparatus system is adapted for use in conjunction with a deboning operation wherein embedded bones within a chunk of meat are removed from the chunk of meat by means of high-velocity jets of water. This process, as defined in U.S. Pat. No. 3,364,518, permits the removal of the embedded bone from the chunk of meat so that the chunk of meat remains substantially intact after extraction of the bone, and whereby the extracted bones also are maintained in an intact condition.

Ordinarily, the chunks of meat to be deboned have bones embedded therein which form articulated joints. The joint between the bones is immobilized by means of a pin device provided with an external fitting which serves as a means to facilitate handling of the chunk of meat and extracted bone during the various steps of the operation.

It is therefore a general object of this invention to provide a continuous apparatus system for coordinated mechanical handling of the chunk of meat to be deboned and for handling the extracted bone and pin device applied thereto. The present apparatus system provides means for receiving and transferring chunks of meat having a pin device applied thereto, to a conveyor system which is arranged in cooperating relation with a deboner unit so that the chunks of meat will be mechanically transferred to the deboning unit removal of the bone therefrom. The deboner unit is provided with suitable means to return the extracted bone with the pin device applied thereto, to the conveyor system so that the pin device, and attached extracted bone may be subsequently transferred to a pin removal apparatus for separation of the pin device from the extracted bones.

Thus the present system permits continuous mechanical handling of the chunk of meat from the pin-applying step to the final step wherein the pin devices are returned to the bone pinning machine.

BRIEF DESCRIPTION OF THE FIGURES OF THE DRAWING

FIG. 2 is an elevational view of the pin removal apparatus used to separate the pin device from the extracted bone;
FIG. 3 is a side elevational view of the apparatus illustrated in FIG. 2;
FIG. 4 is a fragmentary perspective view of a portion of the conveyor device illustrating details of construction thereof;
FIG. 5 is a fragmentary perspective view of the pin-receiving receptacle of the pin removal apparatus illustrated in FIG. 2;
FIG. 6 is a perspective view of the pin-receiving receptacle illustrated in FIG. 5 but in a different position;
FIG. 7 is an elevational view as viewed along line 7—7 of FIG. 3 and looking in the direction of the arrows
FIG. 8 is an enlarged fragmentary view, partly in elevation and partly in section illustrating in detail, certain portions of the apparatus illustrated in FIGS. 2 and 3;
FIG. 9 is a side elevational view illustrating details of construction of the transfer device;
FIG. 10 is an end elevational view of the transfer device illustrated in FIG. 9;
FIG. 11 is a perspective view of the pin device as it is applied to an articulated bone embedded in a chunk of meat;
and
FIG. 12 is the fragmentary plan view of a portion of the pin removal apparatus with certain parts thereof illustrated in an adjusted position by dotted lines configuration.

DETAILED DESCRIPTION OF THE DRAWINGS

Figure 1:
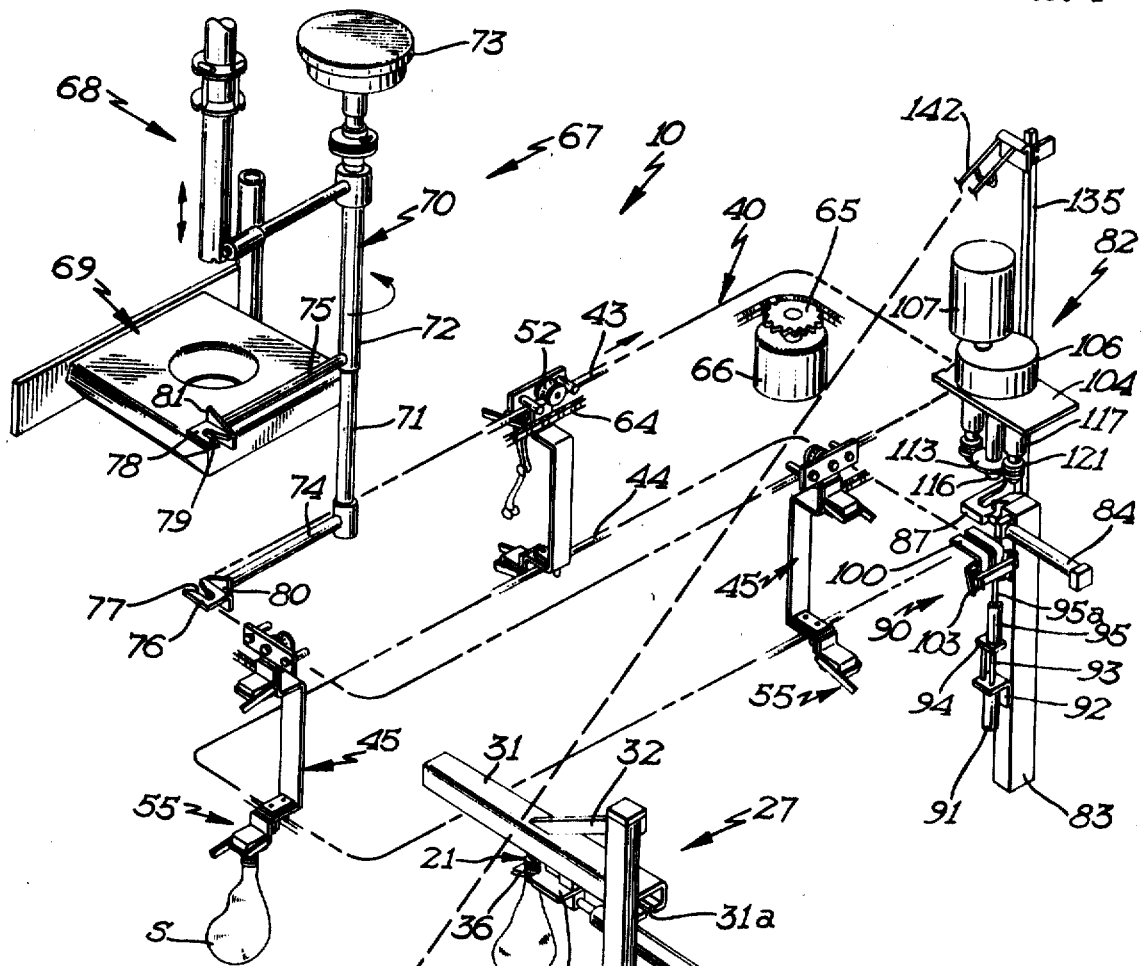
FIG. 1 is a diagrammatic perspective view illustrating various components of the apparatus system.
Figure 1:
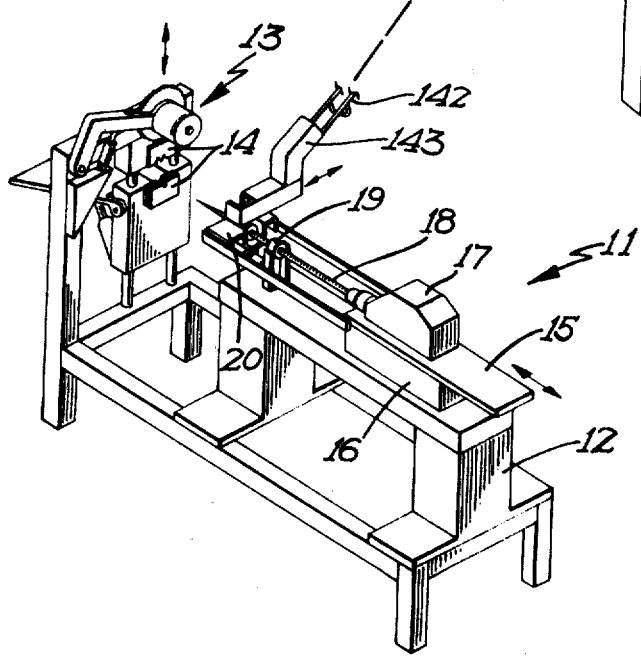

Referring now to the drawings and more specifically to FIG. 1, it will be seen that one embodiment of the novel apparatus system, designated generally by the reference numeral 10, is thereshown. In this apparatus system, chunks of meat such as the pork shoulder S, as shown in FIGS. 1, 9 and 11, are subjected to a boning operation wherein the bone or bones embedded therein are removed. Removal of the bone from the chunk of meat S accomplished in such a manner so as to maintain the chunk of meat in intact condition and to maintain the extracted bones in a substantially intact condition. It will be noted that such chunks of meat have embedded bones therein that form articulated joints, such as the joint between the humerus bone H and the radius bone R. It is necessary in this deboning operation to immobilize the articulated joint so that bones comprising the joint are not separated during the bone removing operation.

To this end, a bone pinning machine 11 is provided for applying a pin device to the embedded bones of the chunk of meat to immobilize the articulated joint therebetween. This bone pinning machine includes a support frame 12 having a positioning and clamping structure 13 thereon. The positioning and clamping structure 13 is comprised of a pair of clamping jaws that are power shifted between open and closed positions for gripping the chunk of meat to which the pin device is to be applied. The positioning and clamping structure also includes means for maintaining the chunk of meat in a predetermined position so that the embedded bones therein are substantially aligned with respect to each other during application of the pin device.

The bone pinning machine also includes means for driving the pin device through the radius bone and through the articulated joint to immobilize the bones. This means includes a slide 15 which is shiftably mounted upon a fluid pressure piston and cylinder unit 16. An electric motor 17 is mounted upon the slide 15 and the output shaft of the electric motor 17 is connected to an elongate threaded shaft 18, the latter projecting through a shiftable nut 19. The nut 19 is arranged and constructed so that when it is disposed in one position, the shaft 18 may be moved axially therethrough without engaging the threads of the nut. However, when the nut is thereafter shifted to a new position, the threads of the nut will engage the threads of the shaft 18, thus requiring the shaft to be revolved if it is to be axially advanced with respect to the nut. A U-shaped support is connected to the slide 15 and is adapted to support a pin device which is to be applied to a chunk of meat. This bone pinning machine is identical in construction and operation to that disclosed in my co-pending application, Ser. No. 774,404, now U.S. Pat. 3,533,129, filed Nov. 8, 1968 and entitled Bone Pinning Machine.

Referring now to FIG. 11, it will be seen that the bone immobilizing pin device designated generally by the pin 21 not only serves to interlock the bones of the articulated joint in predetermined, preferably aligned relation but also provides an external fitting to facilitate handling of the chunks of meat and the extracted bones during the various operational steps of the present apparatus system. The pin device 21 includes an external fitting 22 of cylindrical configuration and preferably formed of a suitable material. The fitting has a diametrical slot 23 at one end thereof and has an upper annular groove 24 and a lower annular groove 25 therein. An elongate threaded shank 26 is affixed thereto and projects axially therefrom. The threaded shank 26 is adapted to be driven longitudinally through the hollow portion of the radius bone without being rotated. The pin device, thereafter, is rotated to thread the shank through the articulated joint as set forh in my above identified co-pending application.

After the pin device has been applied to the embedded bones in a chunk of meat, each such chunk of meat is suspended by the pin device from a transfer device, designated generally by the reference numeral 27, as best seen in FIGS. 1 and 9. The transfer device includes a vertical support element 28 of metallic construction and having one end of an elongate horizontal support element 29 rigidly affixed thereto. The other end of the horizontal support element 29 is rigidly affixed to a vertical support element 30 which constitutes part of a conveyor apparatus to be described in detail hereinbelow.

One end of an elongate horizontal track of guide 31 is rigidly affixed to the vertical support element 28 and it will be noted that this horizontal track is of generally rectangular cross-sectional configuration and provided with an elongate slot 31a throughout the length of the bottom wall thereof. A suitable inclined brace 32 has one end thereof rigidly affixed to the vertical support element 28 and has the other end thereof rigidly secured to the upper wall of the track 31 to support the track, cantilever fashion, from the vertical support.

A carriage 33 projects interiorly of the track 31 through the slot 31a and is supported therein by suitable rollers 34 having rolling contact with the track. The carriage 33 is provided with a horizontal plate 35 which has a recess 36 is one edge thereof. The recess 36 is of a size in configuration to suspend a chunk of meat by engaging the external fitting of the pin device at the lower annular groove 25 thereof. The carriage is fixedly connected by suitable bolts or the like to the outer end of a piston rod 37 which is secured at its other end to a piston positioned within a double acting hydraulic cylinder 38. The hydraulic cylinder is connected a source of hydraulic fluid under pressure and is mounted on a mounting plate 39, the latter being affixed to the vertical support element 28. A carriage 33 also has an inclined cam plate 33a adjacent the outer end thereof, the function of which will be explained more fully herein below.

It will be seen that extension and retraction of the piston rod 37 produces shifting movement of the carriage 33 relative to the guide 31. Thus, when an operator removes a chunk of meat with the pin device 21 applied thereto from the bone pinning machine 11, the chunk of meat may then be placed in suspended relation by inserting the fitting 22 at the lower annular groove in the recess 36 of the plate 35. This transfer is done when the piston rod is in a retracted position so that the carriage is in a receiving position. Thereafter, when the piston rod is extended, the carriage will be urged outwardly in close proximal relation to a conveyor apparatus designated generally by the reference numeral 40, whereby the chunk of meat with the pin device applied thereto will be engaged and suspended from the conveyor apparatus.

Referring now to FIGS. 1, 3, 4 and 9, it will be seen that the conveyor apparatus is positioned in close proximity to the transfer device 27 and in fairly close proximal relation to the bone pinning machine 11. The conveyor apparatus includes an upper mounting plate 41 and a lower mounting plate 42 spaced from the upper mounting plate and supported upon a suitable supporting surface, such as a floor, by a plurality of support elements such as the vertical support element 30. The upper mounting plate 41 has a generally oval or rectangular guide 43 secured thereto adjacent the periphery thereof and the lower mounting plate 42 has a similar, generally oval or rectangular guide 44 secured thereto adjacent the periphery thereof. It will be noted that the upper and lower guides are of circular cross-sectional configuration.

The conveyor apparatus includes a plurality of similar support devices 45, each comprised of a generally vertically oriented support member 46 formed of a suitable metallic material. Each support member 46 is of generalyl U-shaped configuration and includes a web portion 47 having legs 48 projecting therefrom and integral therewith. The uppermost leg 48 has integrally formed therewith an upper terminal portion 49, while the lower leg has a downwardly projecting lower terminal portion 50 integrally formed therewith.

A generally vertically oriented plate 51 is affixed to the upper terminal portion 49 and this plate revolvably mounts a grooved roller 52 which is disposed in rolling contact with the upper guide 43. A pair of generally horizontally oriented guide elements 53 formed of plastic material and mounted on the plate 51 by suitable bolt assemblies are disposed on opposite sides of the groove roller 52 and are also disposed in engaging contact with the upper track 43.

A pair of vertically oriented guide elements 54 are secured to the lowermost leg 48 and are of substantially identical construction to the guide elements 53 but are disposed on opposite sides of the guide or track 44 and in contact therewith. It will therefore be seen that each support device is maintained in supported relation from the upper and lower guides of the conveyor apparatus.

Each support device 45 includes a pair of fitting engaging mechanisms 55, each being of substantially identical construction, one of which is secured to the upper terminal potrion 49 and the other being secured to the lower terminal portion 50 of each support member 46. Each of the fitting engaging mechanisms includes a top wall 56 having opposed side walls 57 affixed thereto and depending therefrom. The side walls 57 terminate in inturned flanges 58 which define a slot 59. The outermost side wall has affixed thereto an outwardly projecting lip 57a, while the top wall of each fitting engaging mechanism has an upturned flange 60 integrally formed therewith. The upturned flange 60 for each fitting engaging mechanism is secured to either the upper terminal portion 49 or the lower portion 50 of the associated support member 46.

Opposite ends of each fitting engaging mechanism is open, and each is provided with a generally U-shaped keeper member 61, the legs of which are pivotally connected by pivots 62 to the innermost side wall 57 thereof.

Each U-shaped keeper member 61 has an outwardly projecting extension 63 projecting outwardly therefrom and it will be noted that the keeper element for each upper and lower fitting engaging mechanism is oppositely arranged as best seen in FIG. 4. An endless conveyor chain 64 is fixedly attached to the upper terminal portion of each support device and this endless conveyor chain is trained about a plurality of sprockets 65 (only one of which is shown). It will be noted that the sprocket shown is connected to a source of power such as the electric motor 66 whereby when the motor is energized, the sprockets drive the endless conveyor chain and move the support devices in a predetermined directional of travel. This travel is indicated by the directional arrow in FIG. 1.

The chunks of meat which are suspended from the lower fitting engaging mechanisms 55 of the conveyor apparatus are moved in the direction of the arrow and into close proximal relation to a deboning unit 67 of the type disclosed in my co-pending application, Ser. No. 699,519, now U.S. Pat. No. 3,533,128 filed Jan. 22, 1968 entitled Process and Apparatus for Deboning Meat. This deboning unit includes a spindle assembly 68 which grips the fitting of the pin device and which causes the chunk of meat to be revolved while the bone is urged through the opening in the iris or barrier assembly 69. A plurality of jet mechanisms are provided for producing high-velocity jets of water that separate the meat in an intact condition from the bone, and bone is pulled through the iris assembly as the spindle assembly is shifted vertically upwardly. Means are also provided for feeding chunks of meat to the deboning unit and for removing extracted bones therefrom. This means for feeding chunks of meat and removing the bones from the deboning unit is designated generally by the reference numeral 70 and includes a vertically oriented tubular shaft 71 which is connected in telescoping relation to a shaft 72, the latter being connected by suitable drive connections to a drive device 73.

One end of an elongate infeed arm 74 is secured to the shaft 71 for rotation therewith and one end of an elogate removal arm 75 is secured to the shaft 72 for rotation therewith. It is pointed out that shaft 71 and 72 are interconnected for rotation as a unit but may be shifted vertically with respect to each other. The outer end of the infeed arm 74 has a support member 76 affixed thereto which is provided with a U-shaped recess 77 therein. Similarly, the removal arm 75 has a support member 78 affixed to the outer end thereof which is provided with a U-shaped recess 79 therein. It will be noted that the recesses in the support members of the infeed and removal arms are oppositely directed with respect to each other and each recess is of a size to engage and suspend a pin device at one of the annular grooves therein. The details of construction of the deboner unit are substantially identical to that disclosed in my co-pending application Ser. No. 699,519. Thus, chunks of meat are transferred to the deboning unit 67 where the bones are extracted from the meat and the extracted bones are then transferred by means of the removal arm into a position to be engaged by the uppermost of the fitting engaging mechanisms 55 of each support device 45.

It will be noted that the shafts 71 and 72 are driven in the direction of the directional arrow of FIG. 1 to thereby revolve the arms 74 and 75 in a predetermined direction. In this regard, the lowermost fitting engaging mechanisms 55 which suspend the chunk of meat from the attached pin device will actually engage the fitting of the pin device at the upper annular groove 24. It is further pointed out that when the chunk of meat and attached pin device is transferred by the transfer device to the conveyor apparatus, the external fitting of each pin device will be engaged by the plate 35 of the carriage 33 at the lower annular groove. The carriage will position the fitting so that it is in obstructing relation with respect to a lower fitting engaging mechanism 55. As each fitting engaging mechanism 55 is moved towards the external fitting, the extension 63 of the U-shaped keeper member will engage a cam plate 33a on the carriage 33 so that the keeper will be moved upwardly and allow the fitting engaging mechanism to engage the fitting. When the keeper drops downwardly, the external fitting of the pin device will be suspended from the fitting engaging mechanism.

The infeed arm 74 will be positioned approximately 90° from the position illustrated in FIG. 1 so that the support member 76 will be disposed in obstructing relation with respect to the path of travel of the lower fitting engaging mechanisms. The U-shaped recess in the support member 76 will be disposed to receive the lower annular groove 25 of the pin device therein as the fitting engaging mechanisms are moved in their predetermined path of travel. The support member 76 is also provided with a cam 80 which serves to raise the U-shaped keeper member 61 by engaging the extension thereof to permit the external fitting of the pin device to engage in the recess 77. Similarly, the support member 78 is also provided with a cam 81 to raise the U-shaped keeper member 61 of each upper fitting engaging mechanism to permit transfer of the external fitting from the support member 78 to the fitting engaging mechanism. In this regard, it will be noted that the U-shaped recess 79 of the removal arm 75 is facing oppositely with respect to the U-shaped recess 77 to permit the transfer to take place.

When the pin device with the extracted bone is transferred to the uppermost fitting engaging mechanism of a support device, the pin device and attached extracted bone will be moved in its predetermined path of travel into proximal relation to a pin removal apparatus 82 to permit separation of the pin device from the extracted bones. This pin removal apparatus 82 includes a vertical support member or post 83 which mounts the various components thereon. A generally horizontally oriented double acting hydraulic cylinder 84 is mounted on a mounting plate 85 which in turn is secured to the vertical post 83 adjacent the upper end portion thereof. This double acting hydraulic cylinder 84 is connected by suitable conduits to a source of hydraulic fluid under pressure and the piston rod 86 thereof is extensible and retractable relative thereto. The outer end of the piston rod 86 has a generally horizontally oriented support member 87 affixed thereto for movement therewith, and this support member has a generally U-shaped recess 88 in one edge thereof. The U-shaped recess is of a size to engage in the lower annular groove 25 of the external fitting of each pin device. The support member 87 also has an inclined cam 89 thereon which engages the extension 63 of the U-shaped keeper member for each upper fitting engaging mechanism 55. It will therefore be seen that when the piston rod 86 is extended, the support member 87 will be in a position to engage and remove the fitting and attached extracted bone from supported relation with respect to the upper fitting engaging mechanism. The cam 89 causes the keeper member associated with the upper fitting engaging mechanism to be raised and to permit removal of the pin device therefrom.

The piston rod 86 will be retracted to move the extracted bones into a position to be gripped by the bone gripping device 90. It will be noted that the bone gripping device 90 is comprised of a vertically oriented double acting hydraulic cylinder 91 which is mounted by means of a bracket 92 on the post 83 adjacent the lower end portion thereof. The piston rod 93 of the hydraulic cylinder 91 is attached at its outer end to a bracket 94 which is affixed to a smaller double acting hydraulic cylinder 95, the latter being vertically oriented. The hydraulic cylinder 95 has mounted thereon, a mounting member 96 and this mounting member has a relatively small plate 97 affixed to the upper end portion thereof.

A pair of swingably mounted gripping members is pivotally mounted on the small plate 97 by means of pivots 99, each being secured to the lower end portions of the gripping members. It will be noted that the gripping members 98 are of generally L-shaped configuration and thus present a generally horizontally oriented gripping element 100 for gripping the extracted bones. To this end it is pointed out that the gripping members 98 are swingable between the open and closed positions, and means are therefore provided for producing this swinging movement.

The piston rol 95a of the hydraulic cylinder 95 projects exteriorly from the cylinder and the outer end thereof has a generally horizontally oriented elongate cam bar 101 affixed thereto for movement therewith. The cam bar 101 has rollers 102 revolvably supported at opposite ends thereof, (these rollers engaging in generally channel-shaped cam tracks 103. Each cam track is actually welded to one of the gripping members so that upon extension and retraction of the piston rod 95a, the coaction of the rollers 102 with the cam tracks will produce opening and closing of the gripping members.

Thus, when a bone attached to a fitting is positioned between the gripping members, and the latter are shifted to the closed position, the bones will be very effectively gripped by the bone gripping device. Thereafter, upon retraction of the piston rod 93 of the double acting hydraulic cylinder, the gripping members will be shifted downwardly.

Referring now to FIGS. 2, 3 and 8 it will be seen that a horizontally oriented plate 104 is rigidly affixed to a diagonal brace 105 which is secured to a suitable support member (not shown). The plate 104 serves as a mounting for a gear reduction box 106 which is connected in driven relation to an electric motor 107. The gear reduction box 106 includes a gear train to reduce the speed of the output shaft of the electric motor.

Referring specifically to FIG. 8, it will be seen that the output shaft 108 of the gear reduction box 106 has an elongate longitudinal slot 108a therein and is positioned interiorly of an elongate sleeve shaft 109. Another shaft 110 is positioned within the sleeve shaft 109 and is also provided with an elongate slot 110a therein. The sleeve shaft 109 is provided with a diametrically extending pin 111 which projects through the slot 108a in the output shaft 108. The sleeve shaft 109 also has a second pin 112 which extends diametrically therethrough and through the slot 110a of the shaft 110. With this arrangement, it will be seen that the output shaft 108, the sleeve shaft 109 and shaft 110 may be shifted in axially telescoping relation with respect to each other, but that the drive from the output shaft 108 will be transmitted through the sleeve shaft 109 to the shaft 110. Thus, the drive from the gear box 106 is through an extensible and retractable drive shaft structure.

The lower end of the shaft 110 has an enlarged circular flange 113 formed thereat. The shaft 110 also has an axially extending slot therein for receiving a substantially flat driver element 114, the driver element being secured in the slot by means of suitable set screws 115. It will be noted that the driver element projects axially beyond the lower end of shaft 110. A generally cylindrically shaped chuck 116 is affixed to the flange 113 by suitable bolts, and the chuck is positioned around the driver element 114 and projects axially from the flange 113.

Means are provided for extending and retracting the shaft construction from the gear box 106 and to this end, it will be seen that a pair of vertically oriented double acting hydraulic cylinders 117 are secured to the lower surface of the plate 104 and project downwardly therefrom. These cylinders are connected to a source of hydraulic fluid under pressure and each has a piston rod 118 projecting axially therefrom. The piston rod for each cylinder has a threaded outer end portion which threadedly engages in an internally threaded nipple or sleeve 119. An elongate bolt 120 mounts a bearing 121 at the lower end of each nipple 119 and it will be noted that each of the bearings 121 is provided with an annular groove 122 therein. This annular groove is of a size to receive the circumferential portions of the flange 113. It will also be noted that the axial opening through the bearings 121 engages an unthreaded portion of the associated bolt 120 so that the bearings are freely revolvable relative to the bolt. With this arrangement, the driver element may be extended and retracted with respect to the support member so as to engage in the slot 23 of each pin device. When the driver element is revolved, and the piston rod 93 retracted, the pin device will be unscrewed or unthreaded from threaded relation with respect to the extracted bones. Unthreading of the pin device is done while the pin device is supported in the support member 87.

The mounting plate 85 which serves to mount the hydraulic cylinder 84 also has a small bracket 123 affixed thereto and disposed generally at right angles thereto. The bracket 123 serves to mount a double acting hydraluic cylinder 124 which is connected to a source of hydraulic fluid under pressure. The piston of the double acting hydraulic cylinder 124 has a piston rod 125 secured thereto and projecting exteriorly of the cylinder 124 for extension and retraction relative to the latter. The piston rod 125 is adapted to engage the pin device after it has been separated from the extracted bone so that the pin device may be returned to the bone pinning machine.

To this end, it will be seen that a receptacle 126 is provided and includes a web portion 127, and a pair of legs 128, integrally formed with the web portion. The legs 128 have inturned flanged 129 secured thereto, the respective inner edges of the flanges being spaced apart to define a slot 130 between the inturned flanges. It will be noted that the legs 128 are not disposed in parallel relation with respect to each other and tend to converge towards the closed end of the receptacle.

The receptacle 126 is pivotally connected to a support member or block 131 which is affixed to the upper end of a piston rod 132. The piston rod 132 is secured to a piston disposed in a vertically oriented double acting hydraulic cylinder 133, this double acting hydraulic cylinder 133 being secured to a bracket 133a which is affixed to the post 83.

It will be noted that the support member of block 131 has a pair of spaced apart, substantially parallel legs 134 affixed thereto and projecting therefrom which are disposed on opposite sides of an elongate vertically oriented guide rod 135. Guide rod 135 is secured to the post 83 and projects upwardly therefrom.

The receptacle 126 is actually pivoted to the support member 131 of the piston rod 132 by means of a pivot 136, the latter being connected to a crank 137 so that swinging movement of the crank produces pivoting movement of the receptacle 126. The crank 137 has a crank arm 138 projecting therefrom and the outer end of the crank arm has a cam roller 139 revolvably mounted thereon. The cam roller 139 is engagable with a lower cam block 140 when the piston rod 132 is in the retracted position and is engagable with an upper cam block 141 when the piston rod 132 is in the extended position. In this regard, it will be noted that when the cam roller 139 engages the lower cam block 140, the slot 130 in the receptacle 126 will be disposed downwardly as best seen in FIG. 6. However, when the piston rod 132 is extended, the cam roller 139 will engage the upper cam block 141 and thus cause swinging movement of the crank 137 and similar swinging movement of the receptacle 136. When this occurs, the receptacle is swung through an arc of approximately 90° so that one of the legs 128 of the receptacle is disposed downwardly. This leg therefore presents a downwardly extending ramp so that the cylindrical fitting of the pin device roll from the receptacle by action of gravity.

In this regard, it is pointed out that when the piston rod 125 is extended, it will engage the external fitting of the pin device and will shift the same along the support member 87 so that the fitting of the pin device will enter the receptacle 126. The slot 130 accommodates the shank or pin of the pin device, the slot being disposed in aligned relation with the U-shaped recess 88 of the support member 87. Thereafter, when the piston rod 132 is extended, the pin device will be elevated by the receptacle and released therefrom upon pivoting movement of the receptacle to permit the pin device to enter an inclined track 142.

Referring now to FIG. 1, it will be seen that the inclined track 142 communicates with a magazine 143 of the bone pinning machine 11. Thus each pin device is continuously returned to the bone pinning machine so that the entire deboning operation is substantially entirely mechanized with a minimum of manual labor required. It is pointed out that the track 142 is preferably passed through a cleaning station where each pin device is treated with steam prior to its return to the magazine 143. Such a steam treating station may be nicely interposed in the track 142 at any convenient location.

It will be noted from the preceding paragraphs that we have provided a novel mechanized apparatus system for use in mechanically handling chunks of meat which are to be deboned. Utilizing a uniquely constructed pin device, not only are the embedded bones in the chunk of meat immobilized, but the fitting provides a medium with which the chunk of meat and extracted bone may be nicely handled by the various components of the entire apparatus system.

Thus it will be seen that we have provided a continuously operable apparatus system, of relatively simple and inexpensive construction, which functions in a highly efficient and effective manner.

What is claimed is:

1. A continuous apparatus system for use in a deboning operation for handling meat to be deboned and for handling bones extracted from the meat, a bone-engaging device having an external fitting being applied to the embedded bone in a chunk of meat, said apparatus system comprising a conveyor device adapted to engage and support the external fitting of a bone engaging device applied to the embedded bone in a chunk of meat, and after removal of the bone, adapted to engage and support the external fitting of the bone engaging device and extracting bone attached thereto, apparatus for disengaging and separating each bone-engaging device from the attached extracted bone including support means adapted to engage each external fitting of each bone-engaging device and to remove the same and attached extracted bone from the conveyor device, a mechanical bone-engaging mechanism adapted to grip the extracted bone while the external fitting of the bone-engaging device is supported by the support means, and a shiftable fitting engaging mechanism adapted to engage the fitting of the pin device and being shiftable to thereby remove the bone-engaging device from engaging relation with respect to the bone while the latter is gripped by the bone-engaging mechanism.

2. An apparatus system for use in deboning operation for handling chunks of meat to be deboned and for handling bones extracted from the meat, a pin device having an external fitting and being embedded in the bone which is embedded in a chunk of meat, said apparatus system comprising a conveyor device adapted to engage and support the external fitting of a pin device applied to the embedded bone in a chunk of meat, and after extraction of the bone from the chunk of meat being adapted to engage and support the external fitting of the bone-engaging device and extracted bone attached thereto, a pin removal apparatus for removing each pin device from the attached extracted bone including shiftable support means shiftable between an extended receiving position and a return position, said support means when in the extended position being disposed in obstructing relation with respect to the conveyor device for engagement with the external fitting of a pin device to remove the same from the conveyor device and to support the pin device and attached extracted bone, a bone-engaging mechanism adapted to grip the extracted bone when the support means is in the return position, and a shiftable fitting engaging mechanism adapted to engage the fitting of a pin device and being shiftable to remove the pin device from the bone while the bone is gripped by the bone-engaging mechanism.

3. The apparatus system as defined in claim 2 wherein said bone engaging mechanism is shiftable away from said support means during removal of the pin device therefrom.

4. The apparatus system as defined in claim 2 wherein said fitting engaging mechanism is revolvable to produce revolving movement of the pin device relative to an attached extracted bone while the latter is gripped by the bone-engaging mechanism.

5. An apparatus system for use in a deboning operation for handling meat to be debonded and for handling bones extracted from the meat, a pin device having an external fitting and being embedded in the bone which is embedded in the chunk of meat, said apparatus system comprising a conveyor device adapted to engage and support the external fitting of a pin device secured to the embedded bone in a chunk of meat, and after extraction of the bone from the chunk of meat, adapted to engage and support the external fitting of the pin device and extracted bone attached thereto, a deboning unit for extracting the bone from the chunk of meat including a mechanical infeed mechanism adapted to engage the fitting of the pin device for removing the chunks of meat from the conveyor device, and to position the chunks of meat interiorly of the deboning unit to permit extraction of the bone from the chunk of meat, said deboning unit including a mechanical removal mechanism adapted to engage the fitting of the pin device and attached extracted bone, and to remove the pin device and bone attached thereto from within the deboning unit to dispose the same in a position to be engaged and supported by the conveyor device, a pin removal apparatus for removing each pin device from the attached extracted bone including support means shiftable between an extended position and a return position, said support means when in the extended position being engageable with the external fitting of the pin device to remove the latter and attached bone from the conveyor device, a mechanical bone-engaging mechanism adapted to grip an extracted bone when the support means is in the return position, a shiftable fitting engaging mechanism engaging the fitting of the pin device and being shiftable relative to the support means to remove the pin device from embedded relation with respect to the bone while the bone is gripped by the bone-engaging mechanism.

6. The apparatus system as defined in claim 5 wherein said conveyor device includes a first group of support mechanisms adapted to engage and support the external fitting of a pin device secured to the embedded bone in a chunk of meat, and a second group of support mechanisms adapted to engage and support the external fitting of a pin device and extracted bone attached thereto.

7. The apparatus system as defined in claim 6 wherein each support mechanism of said first group is connected to a support mechanism of said second group to move in unison therewith.

8. The apparatus system as defined in claim 6 wherein each of said support mechanisms of said conveyor device is provided with a shiftable keeper member which serves to retain each fitting in supported relation with respect to a support mechanism, and each keeper member being shiftable to permit removal of each fitting from supported relation from each support mechanism.

9. The apparatus system as defined in claim 5 wherein each pin device threadedly engages a bone, said fitting engaging mechanism being revolvable when disposed in engaging relation with the pin device to unthread the pin device from an extracted bone while the bone is gripped by the bone engaging mechanism.

10. The apparatus as defined in claim 9 wherein said bone engaging mechanism is shiftable relative to said support means during revolving movement of the fitting engaging mechanism.

11. The apparatus system as defined in claim 5 and a bone pinning machine adapted to apply a pin device to the embedded bone in a chunk of meat, means adjacent said bone pinning machine engaging each fitting of a pin device applied to a chunk of meat to support each chunk of meat in suspending relation therefrom, said suspending means being shiftable to position the external fitting of the pin device in obstructing relation with respect to the conveyor device whereby the conveyor device will engage each pin device and chunk of meat attached thereto and remove the same from said suspending means.

12. The apparatus system as defined in claim 11 and return structure receiving each pin device as it is removed from the extracted bone and returning the same to said bone pinning machine.

References Cited
UNITED STATES PATENTS

| | | | |
|---|---|---|---|
| 3,261,054 | 7/1966 | Kaplan et al. | 17—1(G)X |
| 3,402,423 | 9/1968 | Helgeson et al. | 17—1(G) |
| 3,412,424 | 11/1968 | Brown et al. | 17—1(G) |
| 3,457,586 | 7/1969 | Zwiep et al. | 17—1(G) |

LUCIE H. LAUDENSLAGER, Primary Examiner

U.S. Cl. X.R.

17—46